United States Patent [19]

Mordente et al.

[11] Patent Number: 5,102,466
[45] Date of Patent: Apr. 7, 1992

[54] PRODUCTION OF PIGMENTS

[75] Inventors: Michael Mordente, Glasgow; Alistair B. Boyd, Paisley, both of Scotland

[73] Assignee: Ciba-Geigy Corporation, Ardsley, N.Y.

[21] Appl. No.: 659,804

[22] Filed: Feb. 21, 1991

[30] Foreign Application Priority Data

Feb. 28, 1990 [GB] United Kingdom ............... 9004495

[51] Int. Cl.$^5$ .................. C04B 11/00; C09B 11/02
[52] U.S. Cl. ................... 106/496; 534/575; 534/588; 106/22; 106/23; 106/402
[58] Field of Search .......................... 106/496

[56] References Cited

U.S. PATENT DOCUMENTS

| | | | |
|---|---|---|---|
| 4,655,844 | 4/1987 | Ueno et al. | 106/309 |
| 4,719,292 | 1/1988 | Schui et al. | 534/575 |
| 4,734,489 | 3/1988 | Kawasaki et al. | 534/649 |

FOREIGN PATENT DOCUMENTS

| | | |
|---|---|---|
| 0202906 | 5/1986 | European Pat. Off. |
| 292697 | 6/1988 | European Pat. Off. |
| 0249819 | 9/1987 | Fed. Rep. of Germany |
| 2432538 | 2/1980 | France |
| 1562064 | 3/1980 | United Kingdom |
| 2031925 | 4/1980 | United Kingdom |

OTHER PUBLICATIONS

CA: 93:73767k, Paul Guenthert, Dyeing of thermoplastic materials, May 8, 1980, 12 pages.
CA, 137932k, Dobrovolny, Monoazo lacquers, Oct. 15, 1972, 4 pages.

Primary Examiner—William R. Dixon, Jr.
Assistant Examiner—Timothy D. Saunders
Attorney, Agent, or Firm—Harry Falber

[57] ABSTRACT

The present invention provides a process for the production of a metallized azo pigment having the formula

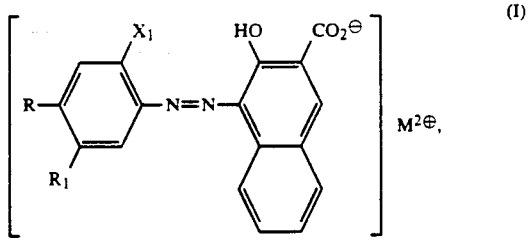

in which R and $R_1$, independently, are hydrogen, halogen or alkyl; $X_1$ is $SO_3^\ominus$ or $CO_2^\ominus$; and M is Ca, Sr, Mn or Ba; comprising coupling, at a pH value below 7.0, a diazotized amine of formula

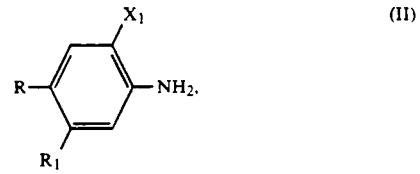

in which R, $R_1$ and $X_1$ have their previous significance, with a coupling component of formula

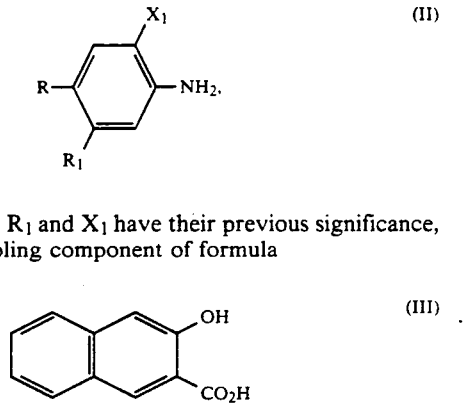

to produce an azo dyestuff having the formula

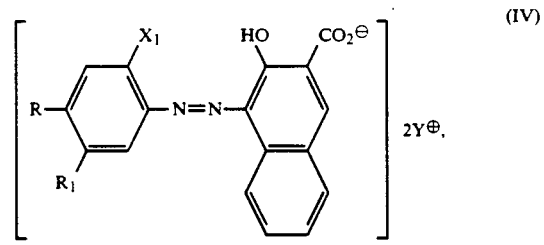

in which R, $R_1$ and $X_1$ have their previous significance, and Y is an alkaline earth metal or ammonium ion; and laking the dyestuff of formula IV during or after its production with one or more salts of a metal M wherein M has its previous significance.

Also disclosed is a new modification of a pigment of formula I.

15 Claims, No Drawings

PRODUCTION OF PIGMENTS

The present invention relates to the production of pigments, in particular to a new process for the production of metallized azo pigments which have a novel crystallographic structure, resulting in increased aqueous stability and bluer hue.

Metallized azo pigments, in particular those having the formula

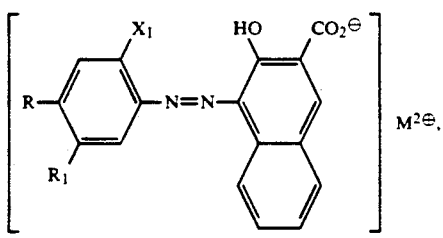

in which R and $R_1$, independently, are hydrogen, halogen or alkyl; $X_1$ is $SO_3^\ominus$ or $CO_2^\ominus$; and M is Ca, Sr, Mn or Ba, are widely used as colourants for printing inks, paints and plastics.

Such pigments are conventionally prepared by a coupling reaction in which a diazotised aromatic amine of formula

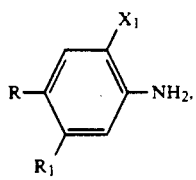

wherein R, $R_1$, $X_1$ have their previous significance, is reacted with a coupling component of formula

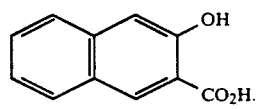

The coupling reaction is conducted in the presence of a metal M or mixture of metals M (where M has its previous significance) at an alkaline pH to produce the metallised azo pigments.

Alternatively, the coupled azo pigment may be aftertreated with a metal M or a mixture of metals M, again at an alkaline pH. This technique is illustrated in U.S. Pat. No. 2,225,665 and U.S. Pat. No. 2,744,027.

The Ca salt versions of pigments of formula (I) have found wide use in various substrates because, e.g. of their good colour stability. Such calcium salts of formula (I), however, when used in aqueous inks, suffer the disadvantage of undergoing an undesired change in hue, from blue-shade red to yellow-shade red.

Since aqueous inks did not, until recently, constitute a large sector of the printing ink market, little attention has been directed towards overcoming this problem.

As concerns in relation to environmental issues have developed, however, there has been a movement away from solvent-based printing inks. This has provided an incentive to attempt to overcome the aforementioned problems associated with the use of calcium salts of compounds of formula I in aqueous inks.

In one attempt to overcome the water instability of calcium salts of compounds of formula (I), it has been proposed, in GB Patent Specification 1562064, to prepare mixed calcium/strontium salts of formula I. It is true that this approach imparts improved colour stability in aqueous inks relative to pure calcium salts, but only at the expense of a deterioration in the desired shade of pure calcium salts.

Surprisingly, we have found that by carrying out the coupling reaction of compounds of formula II with compounds of formula III at acidic pH, a crystallographic modification of the metal salt pigment is produced which has a high degree of aqueous stability and is of a distinctive blue hue.

Accordingly, the present invention provides a process for the production of a metallized azo pigment having the formula I, as hereinbefore defined, comprising coupling, at a pH value below 7.0, a diazotised amine of formula II, as hereinbefore defined, with a coupling component of formula III, as hereinbefore defined, to produce an azo dyestuff having the formula IV:

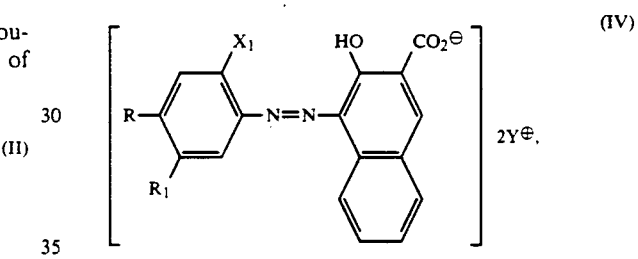

in which R, $R_1$ and $X_1$ have their previous significance, and Y is an alkaline metal or ammonium ion; and laking the dyestuff of formula IV during or after its production with one or more salts of metal M wherein M has its previous significance.

When R and/or $R_1$ are alkyl, they are preferably $C_1$–$C_4$ alkyl, especially methyl. Halogen atoms R and/or $R_1$ are, in particular, chlorine atoms. The preferred pigment of formula I is that wherein R is methyl, $R_1$ is hydrogen, $X_1$ is $SO_3^\ominus$, and M is Ca, known as Calcium 4B toner (Pigment Red 57.1).

The laking operation may be effected by subsequently laking, using a salt of one or more metals M, an azo dyestuff of formula IV as produced according to the process of the present invention; or, preferably, by incorporating a salt of the metal M into the diazotised amine of formula II, prior to effecting the coupling process.

The salt of the metal M may be derived from any water-soluble anion which is inert under the coupling reaction conditions. Inorganic anions are conveniently used, especially chloride and/or nitrate anions.

It is preferred to use an amount of salt of metal M within the range of from 0.75 to 1.75 especially 1.0 to 1.5 moles of metal M, calculated as metal salt per mole of azo pigment of formula IV.

The formation of the diazonium salt from the amine of formula II is conducted using conventional procedures. For example, the amine may be dissolved in water together with alkaline additives e.g. alkali metal hydroxides in particular sodium hydroxide or potassium hydroxide, or more preferably, aqueous ammonia. A molar equivalent of sodium nitrite may then be added at a temperature below 10°, followed by an acid such as hydrochloric acid or acetic acid, so as to render acid the reaction mixture, and thereby complete the diazotization. Preferably, the salt of the metal M is incorporated into the diazonium component, prior to the coupling reaction.

The coupling component may be dissolved in water together with alkaline compounds such as alkali metal hydroxides e.g. sodium, potassium hydroxides or, preferably, aqueous ammonia.

It is essential, when carrying out the process of the present invention, to conduct the coupling reaction at a pH below 7.0. This is conveniently effected by, prior to coupling the diazonium solution and the coupling solution, elevating the pH of the diazonium solution to a value within the range of from 3.0 to 7.0; and lowering the pH of the coupler solution to a value within the range from 5 to 12, preferably 6 to 8. The coupling reaction may then be conducted by mixing the solutions together, preferably by gradually adding the coupler solution to the diazo solution at a pH value of from 3 to 6.9, especially at a pH value of from 4.5 to 5.5.

The pigment products obtained in this way, using the novel acid coupling technique, exhibit a novel crystallographic modification and improved aqueous stability relative to metallised azo pigments produced by conventional alkaline coupling procedures.

The aforementioned conventional process for preparing a Pigment Red 57.1 product produces, on drying at less than 70° C., a compound containing approximately 3 moles of water of crystallisation per molecule of pigment of which approximately 2 moles are reversibly labile after further drying (roasting at 90° C.) as described in p 30-33 of American Ink Maker (December 1986).

This reversibly labile water is considered to be the cause of aqueous instability of Pigment Red 57.1 in water based systems. (The Manufacture of Lakes and Precipitated Pigments—A. W. C. Harrison p 213).

The products of the invention, however, contain approximately 1.5 moles only of non-labile water of crystallisation per molecule of pigment—as determined by Karl-Fischer analysis—thereby distinguishing them from previously prepared materials. Further distinction can be ascertained from the respective powder X-ray diffraction patterns in which the traditional doublet at interplanar spacings (relative intensities) 3.80 (100), 3.91 (100) in conventional products, has approximated to a single caused by the band at 3.80 increasing in relative intensity (150) to that at 3.91 (100). Moreover, the band at approximately 6.32 in the conventional product has split into a multiplet in the product of the invention, and an additional band is observed at 6.55. The interplanar spacings quoted (d values in Angstroms) are calculated from corresponding lines in the DEBYE-SHERRER diagrams (wave length 1.54050 Angstroms, Cu-K-alpha-1-radiation).

These observations are consistent with the product of the invention exhibiting a novel modified crystallographic structure.

Although the pigment produced according to the invention has excellent applicational properties, it can be advantageously prepared as a composition containing known additives which improve performance in the applicational system into which it is to be incorporated (e.g. printing inks, paints and plastic). The additives may be polymeric materials such as polyacrylic acids, polyurethanes, polymaleic acids, polyethylene waxes; natural resin acids such as wood rosin or tall oil rosin or abietic acid type derivatives.

Additives of this type can be added in amounts of 0.05 to 30, preferably 1 to 10% by weight relative to the pigment, before, after or preferably during the coupling procedure.

The following Examples illustrate the invention.

EXAMPLE 1

40 g of 2-amino-5-methyl benzene sulphonic acid are dissolved in 400 g of water containing 26.4 g concentrated ammonia (33%). After cooling with ice to 0° C., 14.8 g sodium nitrite dissolved in 50 g water are added, followed by 65 g concentrated hydrochloric acid, to form a suspension of the diazonium salt. 35 g calcium chloride dissolved in 100 g water are then added to the diazo suspension. The pH of this suspension is then raised to 5.0 by addition of concentrated ammonia.

In a separate container, 42 g of 3-hydroxy-2-naphthoic acid are dissolved in water containing 26.4 g concentrated ammonia. The pH of this solution is then reduced to 7.0 by addition of acetic acid.

This solution of the coupling component is then added to the diazo suspension over a period of about 40 minutes, maintaining the pH at 5.0 by addition of either acid or alkali.

The resulting slurry is then stirred for 1 hour prior to heating to the boil. The bluish/red metallized azo pigment is then isolated by filtration, washed salt free and dried at 60° C.

EXAMPLE 2

52.5 g of 2-amino-4-chloro-5-methyl benzene sulphonic acid are dissolved in 400 g of water containing 15 g concentrated ammonia (33%). After cooling with ice to 0° C., 16.6 g sodium nitrite dissolved in 50 g water are added, followed by 63.5 g of concentrated hydrochloric acid, to form a suspension of the diazonium salt. 43.8 g calcium chloride dissolved in 100 g water are then added to the diazo suspension. The pH of this suspension is then raised to 5.0 by addition of concentrated ammonia.

In a separate container, 44.6 g of 3-hydroxy-2-naphthoic acid are dissolved in 455 mls warm water containing 36.5 g concentrated ammonia. The pH of this solution is then reduced to 7.0 by addition of acetic acid.

This solution of the coupling component is then added to the diazo suspension over a period of about 40 minutes, maintaining the pH at 5.0 by addition of either acid or alkali.

The resulting slurry is then stirred for 1 hour prior to heating to the boil. The bluish/red metallized azo pigment is then isolated by filtration, washed salt free and dried at 60° C.

EXAMPLE 3

52.5 g of 2-amino-5-chloro-4-methyl benzene sulphonic acid are dissolved in 320 g of water containing 12.4 g concentrated ammonia (33%). After cooling with ice to 0° C., 16.7 g sodium nitrite dissolved in 50 g water are added, followed by 55.2 g concentrated hydrochloric acid, to form a suspension of the diazonium salt. 43.8 g calcium chloride dissolved in 100 g water are then added to the diazo suspension. The pH of this suspension is then raised to 5.0 by addition of concentrated ammonia.

In a separate container, 44.6 g of 3-hydroxy-2-naphthoic acid are dissolved in 455 mls warm water containing 36.5 g concentrated ammonia. The pH of this solution is then reduced to 7.0 by addition of acetic acid.

This solution of the coupling component is then added to the diazo suspension over a period of about 40 minutes, maintaining the pH at 5.0 by addition of either acid or alkali.

The resulting slurry is then stirred for 1 hour prior to heating to the boil. The bluish/red metallized azo pigment is then isolated by filtration, washed salt free and dried at 60° C.

EXAMPLE 4

40 g of 2-amino-5-methyl benzene sulphonic acid are dissolved in 400 g of water containing 26.4 g concentrated ammonia (33%). After cooling with ice to 0° C., 14.8 g sodium nitrite dissolved in 50 g water are added, followed by 65 g concentrated hydrochloric acid, to form a suspension of the diazonium salt. 25 g calcium chloride dissolved in 100 g water are then added to the diazo suspension. The pH of this suspension is then raised to 5.0 by addition of concentrated ammonia.

In a separate container, 42 g of 3-hydroxy-2-naphthoic acid are dissolved in warm water containing 26.4 g concentrated ammonia. The pH of this solution is then reduced to 7.0 by addition of acetic acid.

The solution of the coupling component is then added to the diazo suspension over a period of about 40 minutes, maintaining the pH at 5.0 by addition of either acid or alkali.

The resulting slurry is then stirred for 1 hour prior to increasing the pH to 9.0 to finish the coupling reaction. 12 g of strontium nitrate are added and the reaction mixture is stirred for a further hour. 26 g of an acrylic resin at 40% solids, are added, prior to heating to 90° C. for 15 minutes, and lowering the pH to 5.0.

The resulting bluish/red metallized azo pigment is then isolated by filtration, washed salt free and dried at 60° C.

EXAMPLE 5

40 g of 2-amino-5-methyl benzene sulphonic acid are dissolved in 400 g of water containing 26.4 g concentrated ammonia (33%). After cooling with ice to 0° C., 14.8 g sodium nitrite dissolved in 50 g water are added, followed by 65 g concentrated hydrochloric acid, to form a suspension of the diazonium salt. 35 g calcium chloride dissolved in 100 g water are then added to the diazo suspension. The pH of this suspension is then raised to 5.0 by addition of concentrated ammonia.

In a separate container, 42 g of 3-hydroxy-2-naphthoic acid are dissolved in 455 mls warm water containing 26.4 g of ammonia. 25 g of sodium rosinate are added and the pH reduced to 8.0.

The solution of coupling component is then added to the diazo suspension over a period of about 40 minutes, maintaining the pH at 5.0 by addition of either acid or alkali.

The resulting slurry is then stirred for 1 hour prior to heating to the boil. The pigment is isolated by filtration, washed salt free and dried at 60° C.

EXAMPLES 6 TO 10

The procedure described in Examples 1-5 is repeated except that strontium nitrate is added to the diazonium salt suspension instead of calcium chloride.

COMPARATIVE EXAMPLES 1 TO 5

Comparative Example 1

40 g of 2-amino-5-methyl benzene sulphonic acid are dissolved in 400 g of water containing 26.4 g concentrated ammonia (33%). After cooling with ice to 0° C., 14.8 g sodium nitrite dissolved in 50 g water are added, followed by 65 g concentrated hydrochloric acid, to form a suspension of the diazonium salt. 35 g calcium chloride dissolved in 100 g water are then added to the diazo suspension.

In a separate container, 42 g of 3-hydroxy-2-naphthoic acid are dissolved in water containing 26.4 g concentrated ammonia. The solution of the diazo component is then added to the coupling component over a period of 40 minutes, maintaining the pH between 10 and 11. The resulting slurry is stirred for 1 hour prior to heating to the boil. The bluish/red metallised azo pigment is isolated by filtration, washed salt free and dried at 60° C.

The processes of comparative Examples 2 to 5 are effected using the procedure set out in Comparative Example 1, and using the respective starting materials indicated in Examples 2 to 5. In each case, a bluish/red metallised azo pigment is obtained.

EVALUATION OF PIGMENTS

The percentage water of crystallisation present in each of the respective products of Examples 1 to 5 and Comparative Examples 1 to 5 is measured by Karl-Fischer Titration, and gives the following results:

| Example 1 | Comparative Example 1 |
|---|---|
| 5.6% (ca 1.5 mole) | 12% (ca 3 mole) |
| Example 2 | Comparative Example 2 |
| 4.9% | 11.5% |
| Example 3 | Comparative Example 3 |
| 5.3 | 12.1% |
| Example 4 | Comparative Example 4 |
| 5.2% (ca 1.5 mole) | 11.8% (ca 3 mole) |
| Example 5 | Comparative Example 5 |
| 5.7% | 12.0% |

The pigments produced are made into aqueous inks by adding 20 g of the respective pigment to an aqueous binder system having the composition 39 g Joncryl 61 (acrylic resin)
35 g water
5 g isopropanol
1 g tributylphosphate (antifoam)

Each ink formulation thus has a 20% w/v pigment concentration and a binder:pigment ratio of 1:2. The respective formulations are premixed for 15 minutes using a high-speed stirrer and then bead-milled for 10 minutes using glass beads (0.7-1.0 mm diameter). The ink mill bases so prepared are then let down to 10% pigment w/v concentration by adding the appropriate amount of a let down composition comprising 15 g Joncryl 8050 and 9 g water.

The respective inks so prepared are then aged over 7 days at 20°-30° C. The effect of re-hydration, if any, is determined by comparing juxtaposed drawdowns of the old and freshly-prepared inks.

No significant change in hue or livering is observed for Examples 1 to 5 whereas, in Comparative Examples 1 to 5 the resulting azo pigment suffers a severe yellow hue change due to re-hydration.

We claim:

1. A process for the production of a metallized azo pigment having the formula

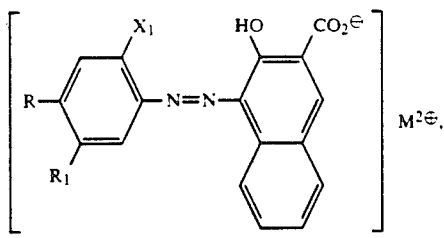

(I)

in which R and $R_1$, independently, are hydrogen, halogen or alkyl; $X_1$ is $SO_3^\ominus$ or $CO_2^\ominus$; and M is Ca, Sr, Mn or Ba; comprising coupling, at a pH value below 7.0, a diazotized amine of formula

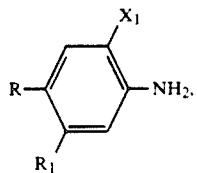

(II)

in which R, $R_1$ and $X_1$ have their previous significance, with with a coupling component of formula

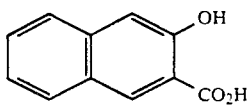

(III)

to produce an azo dyestuff having the formula

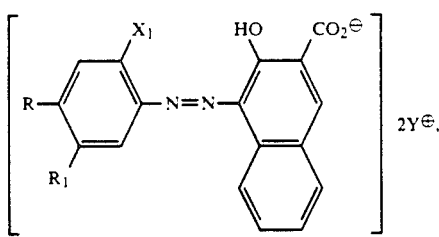

(IV)

in which R, $R_1$ and $X_1$ have their previous significance, and Y is an alkaline metal or ammonium ion; and laking the dyestuff of formula IV during or after its production with one or more salts of a metal M wherein M has its previous significance.

2. A process according to claim 1, wherein R is methyl, $R_1$ is hydrogen, $X_1$ is $SO_3^\ominus$ and M is Ca.

3. A process according to claim 1, wherein a salt of one or more metals M, wherein M is as defined in claim 1, is incorporated into the diazotized amine of formula II, prior to coupling the latter with the coupling component of formula III.

4. A process according to claim 1, wherein the salt of the metal M is a water-soluble inorganic salt.

5. A process according to claim 4, wherein the salt is a chloride and/or nitrate of a metal M.

6. A process according to claim 1, wherein the amount of the salt of the metal M used in the laking operation is from 0.75 to 1.75 moles of metal salt per mole of azo dyestuff of formula IV.

7. A process according to claim 6, wherein the amount of the salt of the metal M is from 1.0 to 1.5 moles of metal salt, per mole of azo dyestuff of formula IV.

8. A process according to claim 1, wherein, prior to the coupling of components II and III, the pH of the diazonium solution derived from the amine of formula II is elevated to a value of from 3.0 to 7.0; the pH of the coupler solution derived from the compound of formula III is lowered to a value of 5 to 12; and the coupling reaction is conducted by gradually adding the coupler solution to the diazo solution at a pH value of 3 to 6.9.

9. A process according to claim 8, wherein the pH of the coupler solution is lowered to 6 to 8, prior to the coupling reaction.

10. A process according to claim 8, wherein the coupling reaction is conducted at a pH value of 4.5 to 5.5.

11. A process according to claim 1, wherein a performance improving agent is added during the process.

12. A process according to claim 11, wherein the performance improving additive is a polyacrylic acid, a polyurethane, a polymaleic acid, a polyethylene wax, wood rosin, tall oil rosin or an abietic acid derivative.

13. A process according to claim 11, wherein the amount of additive added is from 1 to 10% by weight, relative to the pigment.

14. A high molecular weight organic material, a paint or a surface coating containing a metallized azo pigment according to claim 13.

15. A metallized azo pigment corresponding to the formula

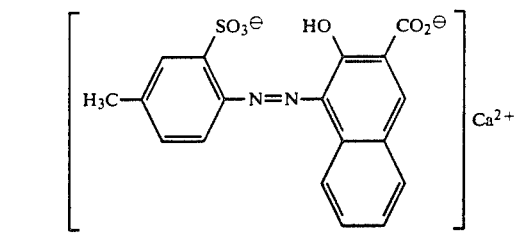

having a content of non-labile water of crystallization of approximately 1.5 moles per mole of pigment, as determined by Karl Fischer analysis.

* * * * *